United States Patent [19]

Strong

[11] Patent Number: 5,730,040

[45] Date of Patent: Mar. 24, 1998

[54] POWER STEERING CONTROL VALVE WITH INCREASED RESISTANCE TO RELATIVE ROTATION BETWEEN VALVE CORE AND VALVE SLEEVE

[75] Inventor: Daniel J. Strong, Clinton Township, Mich.

[73] Assignee: TRW Inc., Lyndhurst, Ohio

[21] Appl. No.: 762,403

[22] Filed: Dec. 9, 1996

[51] Int. Cl.$^6$ .................................................. F15B 9/10
[52] U.S. Cl. ................................. 91/375 A; 137/625.23
[58] Field of Search ...................... 137/625.23; 91/375 A

[56] References Cited

U.S. PATENT DOCUMENTS 3,746,045  7/1973  Bunker et al. .
5,417,244  5/1995  Behrens et al. .

Primary Examiner—Gerald A. Michalsky
Attorney, Agent, or Firm—Tarolli, Sundheim, Covell, Tummino & Szabo

[57] ABSTRACT

A hydraulic power steering control valve (10) includes a valve core (40) and a valve sleeve (50) supported in a housing (14) for relative rotation about an axis (52). The valve core has an outer periphery (42) adjacent to an inner periphery (44) of the valve sleeve. The control valve has at least three groups of ports (PS1, PS2, PS3) extending through the valve sleeve. Each group of ports includes a fluid inlet port and first and second motor ports for communicating fluid between the control valve and a motor. The control valve is movable from a centered condition to an off-center condition to produce, at each one of the groups of ports, a respective area of high pressure fluid (HP-1, HP-2, HP-3) between the outer periphery of the valve core and the inner periphery of the valve sleeve. The areas of high pressure fluid produce a radially directed force between the valve sleeve and the valve core to increase resistance to relative rotation between the valve sleeve and the valve core. In one embodiment the groups of ports are spaced apart at unequal intervals around the axis. In another embodiment, one of the areas of high pressure fluid is substantially different in size from the other areas of high pressure fluid.

13 Claims, 4 Drawing Sheets

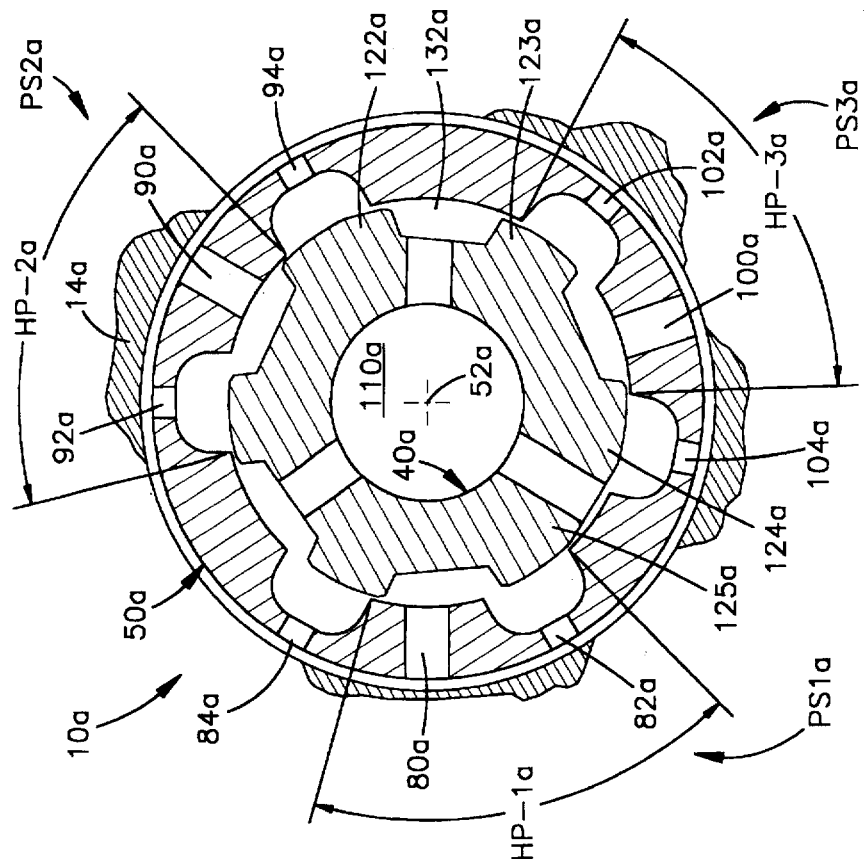
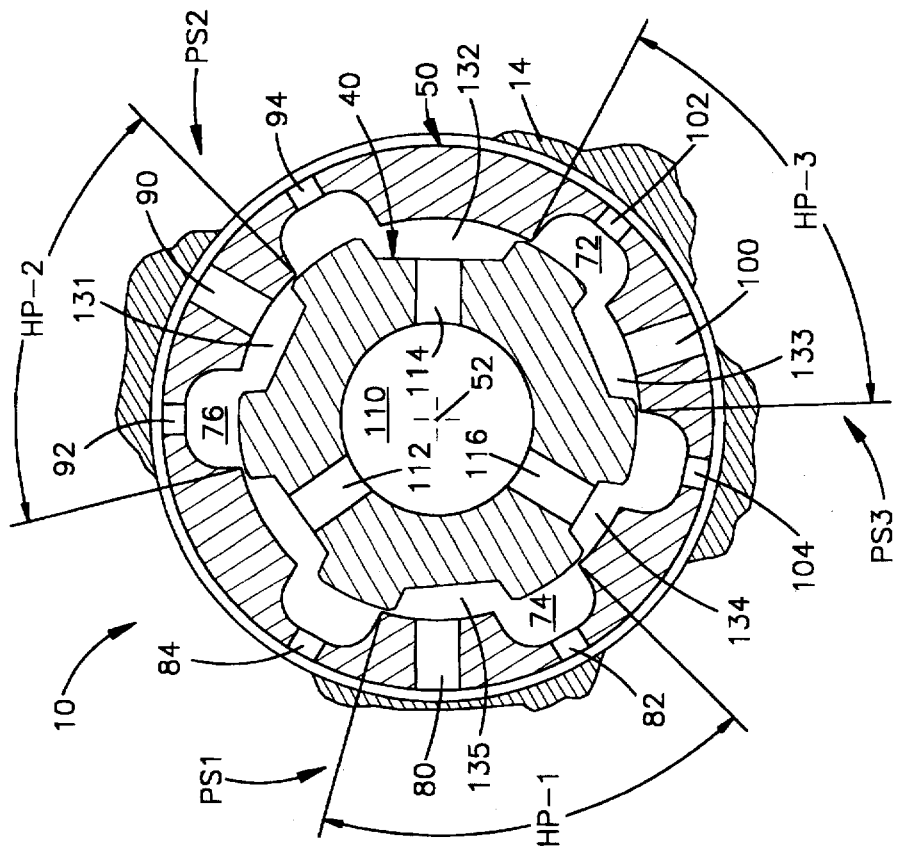
Fig. 4
Fig. 3

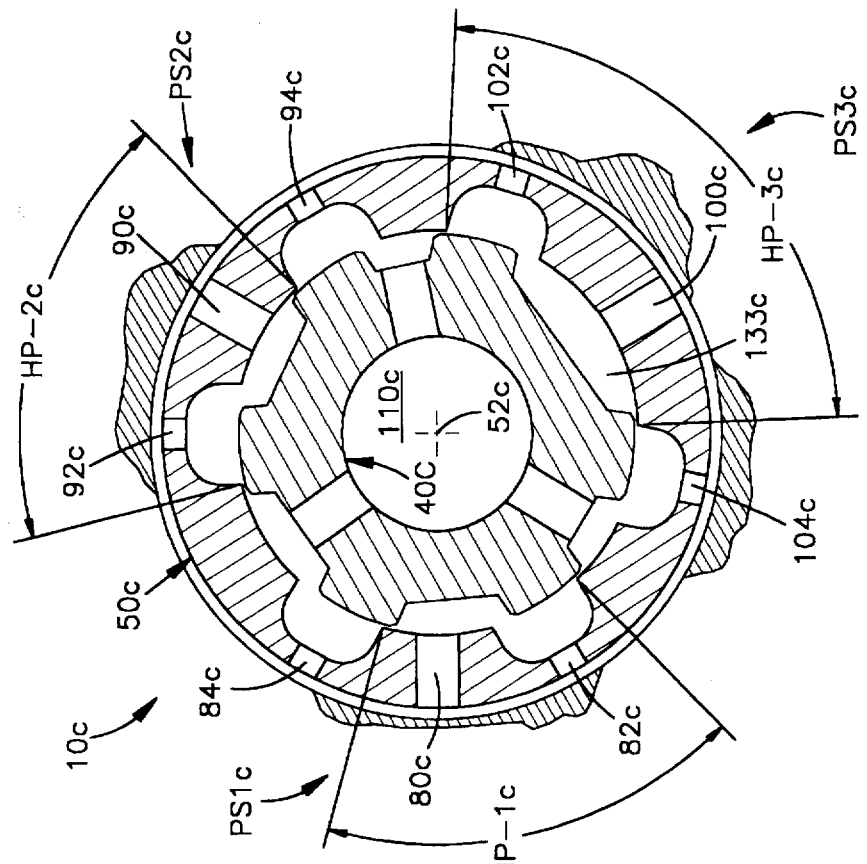
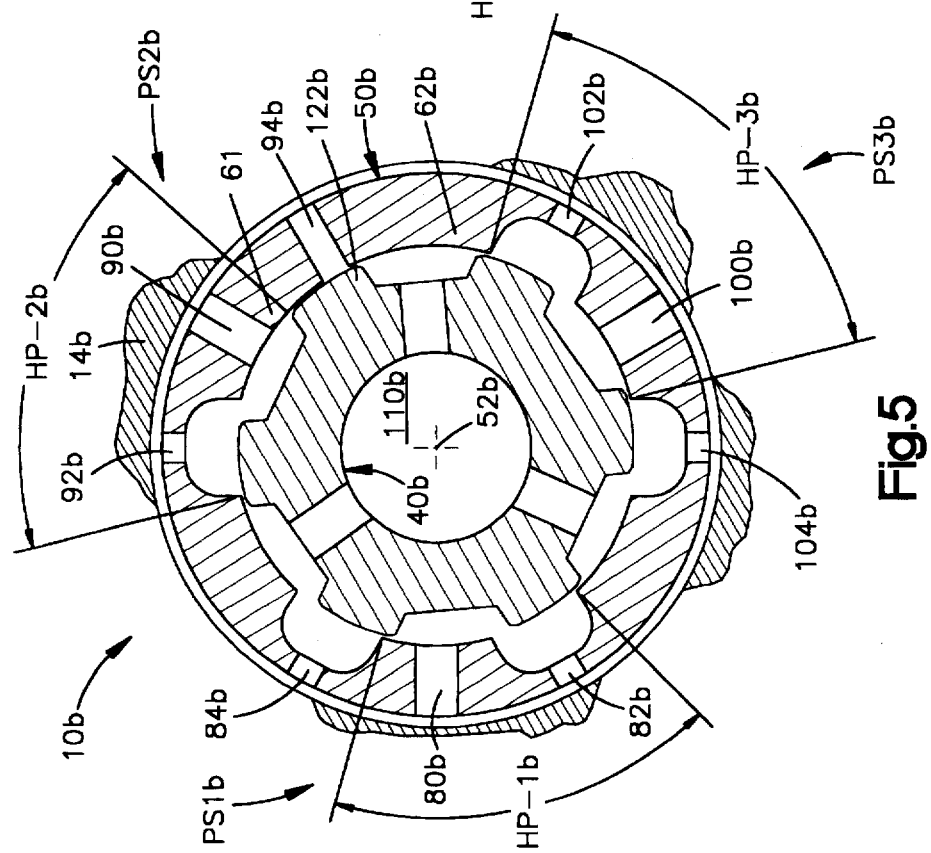

POWER STEERING CONTROL VALVE WITH INCREASED RESISTANCE TO RELATIVE ROTATION BETWEEN VALVE CORE AND VALVE SLEEVE

BACKGROUND OF THE INVENTION

1. Technical Field

The present invention relates to a valve for controlling flow of hydraulic fluid to a hydraulic motor in a hydraulic power assist steering gear assembly.

2. Description of the Prior Art

A typical hydraulic power assist rack and pinion steering gear assembly includes a control valve for controlling fluid flow between a motor and a pump. The control valve includes a valve core connected for rotation with the vehicle steering wheel, and a valve sleeve connected for rotation with the pinion.

It is common for small external rotational forces to act on the valve core or on the pinion (and thus the valve sleeve) during operation of the vehicle. Any such forces which cause relative rotation between the valve sleeve and the valve core change the size of fluid flow control orifices in the control valve. The change in size of the orifices results in pressure fluctuations in the control valve. These pressure fluctuations can be felt by the vehicle operator as vibrations in the vehicle steering wheel. It is desirable to minimize such vibrations.

U.S. Pat. No. 3,746,045 discloses a control valve which produces a radial force between the valve core and the valve sleeve to urge one against the other to prevent vibrations between the valve core and the valve sleeve.

SUMMARY OF THE INVENTION

The present invention is a hydraulic power assist steering system for a vehicle having steerable wheels. The system includes a steering member movable to effect turning movement of the steerable wheels of the vehicle, and a fluid motor for moving the steering member. The motor has first and second fluid chambers. The system also includes a pump for supplying fluid to the motor, a control valve for controlling fluid flow between the pump and the motor, and conduits providing fluid communication between the motor and the pump and the control valve. The control valve includes a valve core and a valve sleeve supported in a housing for relative rotation about an axis. The valve core has an outer periphery adjacent to an inner periphery of the valve sleeve. The control valve has at least three groups of ports extending through the valve sleeve. Each one of the at least three groups of ports includes (a) an inlet port for directing fluid from the pump to the inner periphery of the valve sleeve, (b) a first motor port for communicating fluid between the inner periphery of the valve sleeve and the first fluid chamber of the motor, and (c) a second motor port for communicating fluid between the inner periphery of the valve sleeve and the second fluid chamber of the motor. The control valve is movable from a centered condition to an off-center condition to produce, at each one of the groups of ports, a respective area of high pressure fluid between the outer periphery of the valve core and the inner periphery of the valve sleeve. The conduits direct fluid from the areas of high pressure fluid to the motor to effect movement of the steering member. The areas of high pressure fluid produce a radially directed force between the valve sleeve and the valve core to increase resistance to relative rotation between the valve sleeve and the valve core when the control valve is in the off-center condition.

In one embodiment, the groups of ports are spaced apart at unequal intervals around the axis. As a result, the areas of high pressure fluid are spaced apart at unequal intervals around the axis. In another embodiment, one of the areas of high pressure fluid is substantially different in size from the other areas of high pressure fluid.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein:

FIG. 3 is a view similar to FIG. 2, on a reduced scale, showing the control valve of FIG. 2 in an off-center condition;

FIG. 4 is a view similar to FIG. 3 of a control valve in accordance with a second embodiment of the present invention;

FIG. 5 is a view similar to FIG. 3 of a control valve in accordance with a third embodiment of the present invention; and FIG. 6 is a view similar to FIG. 3 of a control valve in accordance with a fourth embodiment of the present invention.

DESCRIPTION OF PREFERRED EMBODIMENTS

Figure 1:
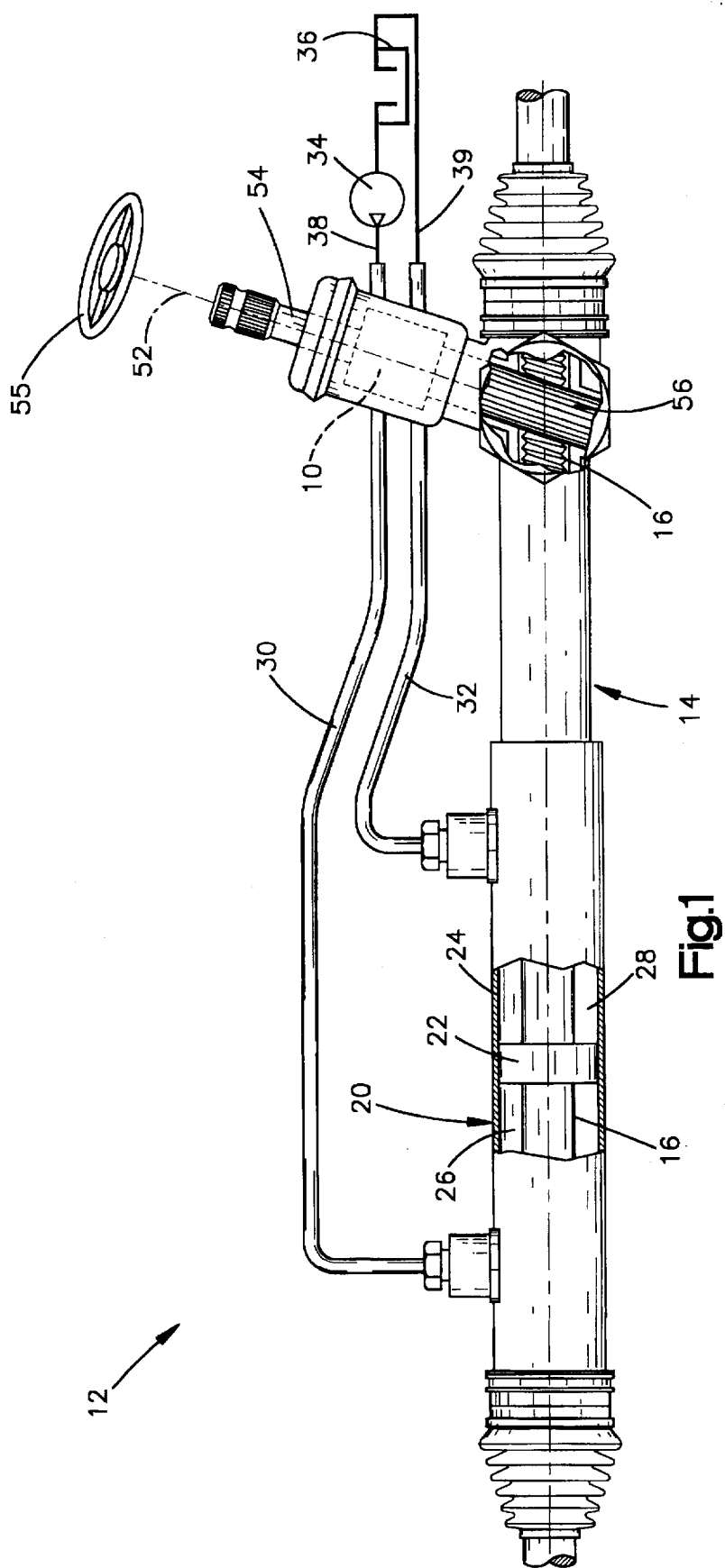
FIG. 1 is an elevational view, partly in section, of a hydraulic power assist rack and pinion steering gear assembly including a control valve in accordance with a first embodiment of the present invention.

The present invention relates to a valve for controlling fluid flow in a hydraulic power assist steering gear assembly. As representative of the present invention, FIG. 1 illustrates a hydraulic power steering control valve 10. The control valve 10 forms a part of a rack and pinion steering gear assembly 12.

The steering assembly 12 includes a housing 14. A steering member in the form of a rack 16 is supported by and is movable relative to the housing 14. Opposite ends of the rack 16 are connected by suitable linkage with steerable wheels (not shown) of the vehicle. Upon movement of the rack 16 relative to the housing 14, the steerable wheels of the vehicle are turned in a known manner.

The steering assembly 12 includes a hydraulic motor 20 for assisting the vehicle operator in turning the steerable wheels of the vehicle. The hydraulic motor 20 includes a piston 22 which is fixedly connected to the rack 16. The piston 22 is disposed in a cylinder 24 formed by the housing 14. The piston 22 divides the cylinder 24 into first and second fluid chambers 26 and 28.

The control valve 10 (described below in detail) is disposed in the housing 14. The control valve 10 is connected with the first and second chambers 26 and 28 of the motor 20 by a pair of conduits 30 and 32. The control valve 10 is also connected with a pump 34 and with a reservoir 36, by another pair of conduits 38 and 39.

The control valve 10 includes a valve core 40 (FIG. 2) located within a valve sleeve 50 and coaxial with the valve sleeve. The valve core 40 and the valve sleeve 50 are supported in the housing 14, in a known manner, for relative rotation about an axis 52. An outer periphery 42 of the valve core 40 is adjacent to an inner periphery 44 of the valve sleeve 50.

The valve core 40 is connected for rotation with, and is preferably formed as one piece with, an input shaft 54 (FIG. 1). The input shaft 54 is connected for rotation with a steering wheel 55 of the vehicle. The valve sleeve 50 (FIG. 2) is connected with a pinion 56 (FIG. 1). The pinion 56 is in meshing engagement with the rack 16. A torsion bar (not shown) interconnects the input shaft 54 and the pinion 50.

Upon rotation of the vehicle steering wheel 55, the control valve 10 selectively directs hydraulic fluid torsion bar twists to enable the valve core 40 to rotate relative to the valve sleeve 50. Upon such relative rotation, under pressure from the pump 34 to the motor 20. Operation of the hydraulic motor 20 moves the rack 16 and drives the pinion 56 in a follow-up manner to rotate the valve sleeve 50 relative to the valve core 40. The control valve 10 returns to a neutral condition when the steerable wheels of the vehicle have been turned to an extent corresponding to rotation of the steering wheel 55 and input shaft 54.

The valve sleeve 50 (FIG. 2) has on its inner periphery 44 six axially extending, circumferentially spaced lands 61, 62, 63, 64, 65 and 66. The sleeve lands 61–66 define six axially extending, circumferentially spaced slots or grooves 71, 72, 73, 74, 75 and 76 which are spaced alternately between the sleeve lands.

The valve sleeve includes three complete groups or set of ports PS1, PS2 and PS3 for directing fluid flow between the pump 34 and the motor 20. The sets of ports PS1-PS3 are identical to each other, although, as described below, they are not equally spaced about the axis 52. Each set of ports PS1-PS3 is similar in operation to the other sets.

The first port set PS1 includes a fluid inlet port 80 (FIG. 2) which extends through a first one 65 of the sleeve lands 61–66. The fluid inlet port 80 is connected in a known manner (not shown) with the conduit 38 and, thereby, with the output of the pump 34.

The first port set PS1 includes a first or left motor port 82 which terminates in the sleeve groove 74. The first port set PS1 also includes a second or right motor port 84 which terminates in the sleeve groove 75. The sleeve grooves 74 and 75 are adjacent each other and are spaced apart on opposite sides of the fluid inlet land 65. The motor ports 82 and 84 are spaced apart by 60° around the axis 52. The fluid inlet port 80 is centered between the motor ports 82 and 84.

The second port set PS2 includes a fluid inlet port 90 (FIG. 4) which extends through the sleeve land 61. The fluid inlet port 90 is connected in a known manner (not shown) with the conduit 38 and, thereby, with the output of the pump 34.

The second port set PS2 includes a first or left motor port 92 which terminates in the sleeve groove 76. The second port set also includes a second or right motor port 94 which terminates in the sleeve groove 71. The sleeve grooves 76 and 71 are adjacent each other and are spaced apart on opposite sides of the fluid inlet land 61. The motor ports 92 and 94 are spaced apart by 60° around the axis 52. The fluid inlet port 90 is centered between the motor ports 92 and 94.

The fluid inlet port 90 in the second port set PS2 is spaced apart 120° about the axis 52, from the fluid inlet port 80 in the first port set PS1. Thus, the second port set PS2, as a whole, is spaced apart 120° from the first port set PS1.

The third port set PS3 includes a fluid inlet port 100 (FIG. 4) which extends through the sleeve land 63. The fluid inlet port 100 is connected in a known manner (not shown) with the conduit 38 and, thereby, with the output of the pump 34.

The third port PS3 set includes a first or left motor port 102 which terminates in the sleeve groove 72. The third port set PS3 also includes a second or right motor port 104 which terminates in the sleeve groove 73. The sleeve grooves 72 and 73 are adjacent each other and are spaced apart on opposite sides of the fluid inlet land 63. The motor ports 102 and 104 are spaced apart by 60° around the axis 52. The fluid inlet port 100 is centered between the motor ports 102 and 104.

The third port set PS3 is shifted 12° clockwise (as viewed in FIG. 2) from a uniform 120° spacing around the axis 52. Specifically, the fluid inlet port 100 in the third port set is spaced apart 132° from the fluid inlet port 90 in the second port set PS2. Thus, the third port set PS3, as a whole, is spaced apart 132° from the first port set PS1. As a result, the third port set PS3 is spaced apart 108° from the first port set PS1.

The valve core 40 has an axially extending return passage 110. The return passage 110 is connected, in a manner not shown, with the conduit 39 and, thereby, with the sump 36. Three return channels 112, 114 and 116 extends radially in the valve core 40 between the outer periphery 42 of the valve core and the return passage 110.

The valve core 40 has on its outer periphery 42 six axially extending, circumferentially spaced lands 121, 122, 123, 124, 125 and 126. The core lands 121–126 define six axially extending, circumferentially spaced slots or grooves 131, 132, 133, 134, 135 and 136 which are spaced alternately between the core lands.

The core lands 121–126 and the core grooves 131–136 are arranged to align with the sleeve lands 61–66 and the sleeve grooves 71–76. Thus, when the control valve 10 is in the centered condition shown in FIG. 2, each core land 121–126 is centered radially inward of a respective sleeve groove 71–76.

On the valve core 40, the lands 123 and 124 and the groove 133 are shifted 12° clockwise (as viewed in FIG. 2) from a uniform 120° spacing around the axis 52. As a result, the one core groove 134 is substantially narrower than the core grooves 131–133 and 135–136; and the core groove 132 is substantially wider than the core grooves 131–134 and 136. The core lands 123 and 124 and the core groove 133 are disposed radially inwardly of the third port set PS3.

Figure 2:
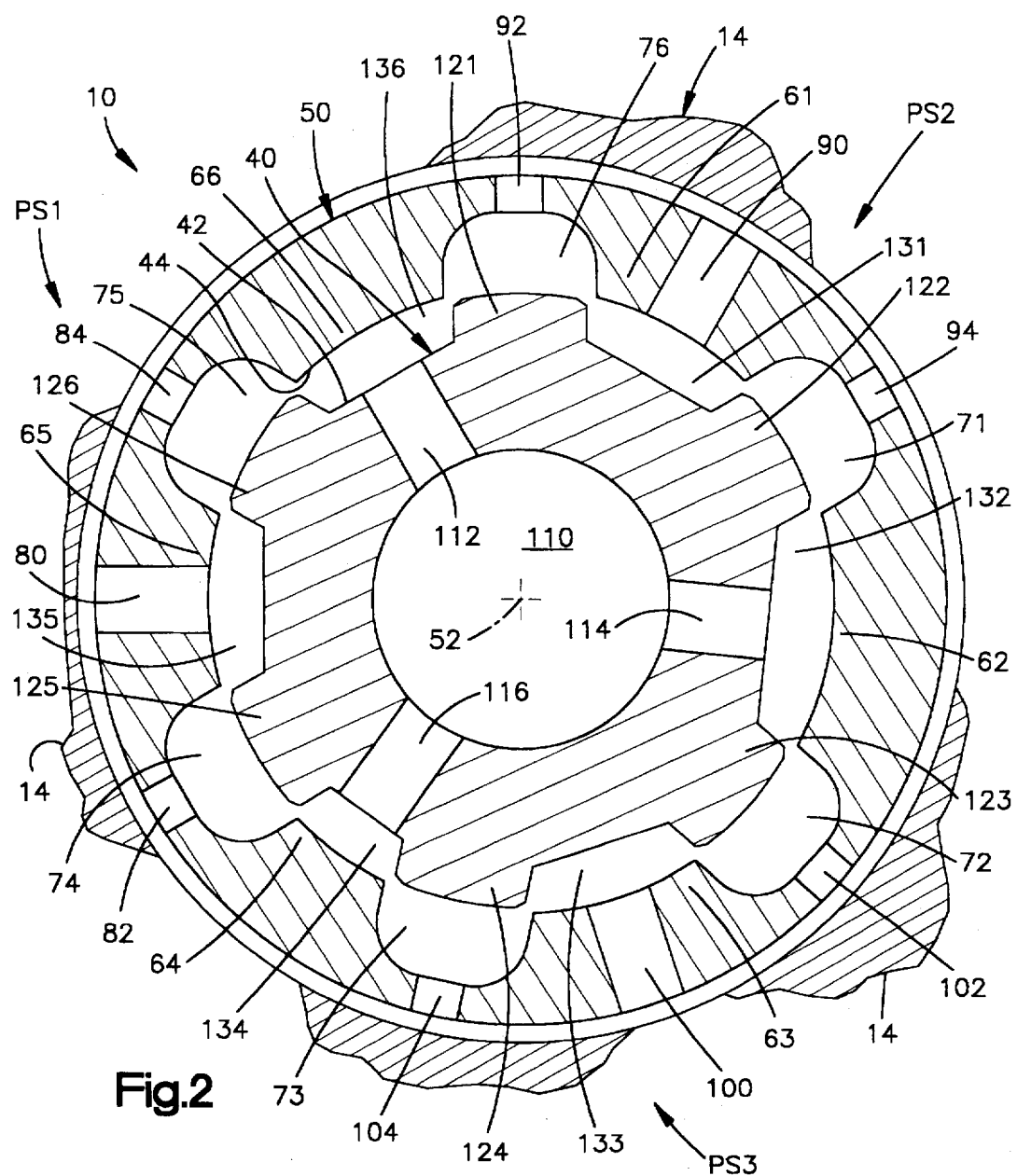
FIG. 2 is a schematic sectional view of the control valve of FIG. 1, shown in a centered condition.

When the valve core 40 and the valve sleeve 50 are in the neutral or centered condition shown in FIG. 2, fluid from the pump 34 flows into the control valve 10 through the fluid inlet ports 80, 90 and 100. The flow from the fluid inlet ports, 80, 90 and 100 is, in a known manner, split in substantially equal amounts to flow past the several left and right motor ports. As a result, the pressures in the fluid chambers 26 and 28 in the cylinder 24 are substantially equal. Therefore, the piston 22 does not move in the cylinder 24, and no steering assist is provided to the rack 16. The fluid flows to the sump 36 through the return channels 112–116 and the return passage 110 in the valve core 40.

When the vehicle steering wheel 55 is turned in a first direction, the valve core 40 is rotated counterclockwise (as viewed in FIG. 2) relative to the valve sleeve 50. Steering assist is provided by the motor 20 to cause the steerable wheels of the vehicle to turn to move the vehicle to the left.

Specifically, three areas of high pressure fluid HP-1, HP-2 and HP-3 (FIG. 3) are created by the closing of certain orifices in the valve 10 and the openings of other orifices. At the first port set PS1, the fluid in the core groove 135 and the sleeve groove 74 is at a high pressure. At the second port set PS2, the fluid in the core groove 131 and the sleeve groove 76 is at a high pressure. At the third port set PS3, the fluid in the core groove 133 and the sleeve groove 72 is at a high pressure.

As a result, the fluid pressure at the left motor ports 82, 92 and 102 is substantially greater than the fluid pressure at the right motor ports 84, 94 and 104. The pressure in the fluid chamber 26 is thus substantially greater than the pressure in the fluid chamber 28. Therefore, the piston 22 moves in the cylinder 24 in a direction to the right as viewed in FIG. 1. The steerable wheels of the vehicle are turned in a direction to move the vehicle to the left.

As the piston 22 moves in the cylinder 24, fluid is exhausted from the low pressure fluid chamber 28. This fluid flows through the conduit 32 and through the right motor ports 84, 94 and 104 into the control valve 10. This fluid flows to the sump 36 through the return channels 112–116 and the return passage 110 in the valve core 40.

The fluid in each one of the areas of high pressure HP-1, HP-2 and HP-3 is at the same pressure as the fluid in each of the other areas of high pressure. Also, the size of each one of the areas of high pressure HP-1, HP-2 and HP-3 is the same as the size of each of the other areas of high pressure. The three port sets PS1-PS3 are, however, not spaced at equal intervals around the axis 52. Thus, the three areas of high pressure HP-1, HP-2 and HP-3 are not spaced at equal intervals around the axis 52. The forces generated by the three areas of high pressure HP-1, HP-2 and HP-3 therefore act at unequal angles or intervals around the axis 52.

Therefore, a resulting force is produced which attempts to produce relative radial (not rotational) movement between the valve core 40 and the valve sleeve 50. The resultant of the forces generated by the three areas of high pressure HP-1, HP-2 and HP-3 is a vector which has a radial component. The force vector acts generally in the direction between lower left and upper right as viewed in FIGS. 2 and 3.

This resultant force acts between the outer periphery 42 of the valve core 40 and the inner periphery 44 of the valve sleeve 50. This resultant force attempts to produce relative radial movement between the valve core 40 and the valve sleeve 50. Although such movement might not occur because of the close tolerances in the control valve 10, this force increases the resistance to relative rotation between the valve core 40 and the valve sleeve 50. The increased resistance to relative rotation can reduce vibrations felt in the vehicle steering wheel 55.

When the vehicle steering wheel 55 is turned in a second direction (not shown) opposite the first direction, the valve core 40 is rotated clockwise (as viewed in FIG. 2) relative to the valve sleeve 50. Steering assist is provided by the motor 20 to cause the steerable wheels of the vehicle to turn to move the vehicle to the right. Again, three areas of high pressure fluid are created between the outer periphery 42 of the valve core 40 and the inner periphery 44 of the valve sleeve 50, including the location of each of the right motor ports 84, 94 and 104. The fluid in each one of the areas of high pressure is at the same pressure as the fluid in each of the other areas of high pressure. Also, the size of each one of the areas of high pressure is the same as the size of each of the other areas of high pressure. As is the case with a left turn as described above, however, the three areas of high pressure are not spaced at equal intervals around the axis 52. Therefore, the three areas of high pressure generate a combined or resultant force vector within the valve 10 which has a radial component. This force acts between the outer periphery 42 of the valve core 40 and the inner periphery 44 of the valve sleeve 50 to increase the resistance to relative rotation between the valve core and the valve sleeve.

FIG. 4 is a schematic view similar to FIG. 3 of a control valve 10a in accordance with a second embodiment of the present invention. The control valve 10a is generally similar in construction and mode of operation to the control valve 10, but with some changes to make it easier to manufacture. Parts of the control valve 10a which are similar to corresponding parts of the control valve 10 are given the same reference numeral with the suffix "a" added for clarity.

In the control valve 10 (FIG. 3), shifting the port set PS3, as described, produces one substantially wider core groove (the core groove 132) and one substantially narrower core groove (the core groove 134). This can be more expensive to manufacture than a core in which all grooves are the same width.

Therefore, in the control valve 10a (FIG. 4), the one port set PS3a remains shifted, but the core grooves are all the same width. This is accomplished by widening the lands 122a and 123a on either side of the wide core groove 132a toward each other. The core groove 132a is, effectively, narrowed to the same width as the other core grooves. Also, the lands 124a and 125a on either side of the narrow core groove 134a are widened toward each other and joined so that the narrow core groove 134 is eliminated altogether.

These changes have no undesired fluid flow effects when the control valve 10a is off-center by anything more than a small amount. These changes also have no radial force effect. All the radial force, for increasing resistance to relative rotation, comes from the angular shifting of the one port set PS3a.

The control valve 10a thus has equal forces which act at unequal angles around the axis 52a. And, because the one port set PS3a is internally symmetrical, its resultant force has the same magnitude whether the control valve 10a is turned left or right, as in the case of the control valve 10.

FIG. 5 is a schematic view similar to FIG. 3 of a portion of a control valve 10b in accordance with a third embodiment of the present invention. The control valve 10b is generally similar in construction and mode of operation to the control valve 10. Parts of the control valve 10b which are similar to corresponding parts of the control valve 10 are given the same reference numeral with the suffix "b" added for clarity.

In the control valve 10b, the port sets PS1b-PS3b are disposed at equal 120° intervals around the axis 52b. However, there is no sleeve groove in the control valve 10b corresponding to the sleeve groove 71 (FIG. 2). Thus, the one right motor port 94b (FIG. 4) extends through a sleeve land which includes the conjoined lands 61 and 62, rather than through a sleeve groove. Because of this, the one right motor port 94b is effectively closed at all valve angles by the core land 122b.

Because the one sleeve groove is missing, the fluid areas on either side of the right motor port 94b are smaller than the corresponding areas at the other port sets PS1b and PS3b. Thus, the amount of force provided by the high pressure fluid at the port set PS2b or the port set PS3b (depending on direction of turn) is not as great as it is at the other two port sets. Therefore, the control valve 10b has unequal internal forces, producing a net radial force which increases relative rotation between the valve core 40b and the valve sleeve 10b.

Also, because of the missing sleeve groove, the high pressure area HP-2b terminates at the edge of the core land 122b. Therefore, the angular extent of the high pressure area HP-2b is slightly smaller than the angular extent of the high pressure areas HP-1b and HP-3b. As a result, the circumferential center of the high pressure area HP-2b is offset slightly counterclockwise from a true 120° orientation. Thus, the internal forces act at unequal angles about the axis 52b.

Because of the missing sleeve groove, the port set PS2b is not internally symmetrical. Therefore, the resultant radial force between the valve core 40b and the valve sleeve 50b, which acts to increase the resistance to relative rotation, has different magnitudes depending on whether the control valve 50b is turned left or right.

FIG. 6 is a schematic view similar to FIG. 5 of a portion of a control valve 10c in accordance with a third embodiment of the present invention. The control valve 10c is generally similar in construction and mode of operation to the control valve 10b. Parts of the control valve 10c which are similar to corresponding parts of the control valve 10b are given the same reference numeral with the suffix "c" added for clarity.

In the control valve 10c, the port sets PS1c-PS3c are disposed at equal 120° intervals around the axis 52c. However, the one port set PS3c has a larger circumferential extent than the other port sets PS1c and PS2c. Specifically, in the port set PS3c the left and right motor ports 102c and 104c are spaced apart by 90° about the axis 52c, while the other port sets PS1c and PS2c have only a 60° spacing between their left and right motor ports.

Because the one port set PS3c is wider, it produces a high pressure area HP-3c which is wider and thus larger. Thus, the port set PS3c produces high pressure areas HP-3c which acts with greater force between the valve core 40c and the valve sleeve 50c than the other two port sets PS1c and PS2c. Therefore, the valve 10c has unequal forces which act at equal angles about the axis 52c to increase resistance to relative rotation between the valve core 40c and the valve sleeve 50c. And, because each port set PS1c-PS3c is internally symmetrical, the resultant force has the same magnitude whether the control valve 10c is turned left or right.

From the above description of the invention, those skilled in the art will perceive improvements, changes and modifications in the invention. Such improvements, changes and modifications within the skill of the art are intended to be covered by the appended claims.

Having described the invention, I claim:

1. A hydraulic power assist steering system for a vehicle having steerable wheels, said system comprising:

a steering member movable to effect turning movement of the steerable wheels of the vehicle;

a fluid motor for moving said steering member, said motor having first and second fluid chambers;

a pump for supplying fluid to said motor;

a control valve for controlling fluid flow between said pump and said motor; and conduits providing fluid communication between said motor and said pump and said control valve;

said control valve comprising a valve core and a valve sleeve supported in a housing for relative rotation about an axis, said valve core having an outer periphery adjacent to an inner periphery of said valve sleeve;

said control valve having at least three groups of ports extending through said valve sleeve, each one of said at least three groups of ports including (a) an inlet port for directing fluid from the pump to the inner periphery of said valve sleeve, (b) a first motor port for communicating fluid between the inner periphery of said valve sleeve and said first fluid chamber of said motor, and (c) a second motor port for communicating fluid between the inner periphery of said valve sleeve and said second fluid chamber of said motor;

said control valve being movable from a centered condition to an off-center condition to produce, at each one of said groups of ports, a respective area of high pressure fluid between the outer periphery of said valve core and the inner periphery of said valve sleeve, said conduits directing fluid from said areas of high pressure fluid to said motor to effect movement of said steering member;

said control valve comprising means for producing a radially directed force between said valve sleeve and said valve core to increase resistance to relative rotation between said valve sleeve and said valve core when said control valve is in the off-center condition, said means for producing a radially directed force comprising said areas of high pressure fluid.

2. A steering system as set forth in claim 1 wherein said areas of high pressure fluid are spaced apart at unequal intervals around said axis.

3. A steering system as set forth in claim 2 wherein each one of said areas of high pressure fluid is substantially the same size as each other one of said areas of high pressure fluid.

4. A steering system as set forth in claim 2 wherein said valve core includes a plurality of alternating, axially extending core lands and core grooves disposed on the outer periphery of said valve core, each one of said core grooves having substantially the same width.

5. A steering system as set forth in claim 1 wherein one of said areas of high pressure fluid is substantially different in size from the other areas of high pressure fluid.

6. A steering system as set forth in claim 1 wherein said areas of high pressure fluid are spaced apart at equal intervals around said axis and wherein one of said areas is substantially different in size from the other areas of high pressure fluid.

7. A steering system as set forth in claim 6 wherein:

said valve core includes a plurality of alternating, axially extending core lands and core grooves disposed on the outer periphery of said valve core;

said valve sleeve includes a plurality of alternating, axially extending sleeve lands and sleeve grooves disposed on the inner periphery of said valve sleeve;

the number of said sleeve lands being one less than the number of said core lands.

8. A steering system as set forth in claim 6 wherein at least one of said groups of ports has a greater circumferential extent than the others of said groups of ports.

9. A steering system as set forth in claim 1 wherein said groups of ports are spaced apart at unequal intervals around said axis.

10. A steering system as set forth in claim 1 wherein said valve core includes a plurality of alternating, axially extending core lands and core grooves disposed on the outer periphery of said valve core, each one of said core grooves having substantially the same width.

11. A steering system as set forth in claim 1 wherein said valve core includes a plurality of alternating, axially extending core lands and core grooves disposed on the outer periphery of said valve core, said plurality of core lands and core grooves including core grooves having at least two substantially different widths.

12. A steering system as set forth in claim 1 wherein said valve sleeve includes a plurality of alternating, axially extending sleeve lands and sleeve grooves disposed on the inner periphery of said valve sleeve, one of said first and second motor ports in one of said at least three groups of ports extending through a first one of said sleeve lands, each remaining one of said first and second motor ports in said at least three groups of ports extending through a respective one of said sleeve grooves.

13. A steering system as set forth in claim 1 wherein said valve sleeve includes a plurality of alternating, axially extending sleeve lands and sleeve grooves disposed on the inner periphery of said valve sleeve;

said valve core includes a plurality of alternating, axially extending core lands and core grooves disposed on the outer periphery of said valve core;

the number of said sleeve lands being different from the number of said core lands.

* * * * *